United States Patent [19]

Minghella

[11] 3,811,083

[45] May 14, 1974

[54] AUTOMATIC POSITIONING DEVICE EXHIBITING HIGH ACCURACY AND REPEATABILITY

[75] Inventor: Paul F. Minghella, Woburn, Mass.

[73] Assignee: The United States of America as represented by the Secretary of the United States Army, Washington, D.C.

[22] Filed: Apr. 9, 1973

[21] Appl. No.: 349,367

[52] U.S. Cl.................. 318/466, 318/12, 318/469
[51] Int. Cl. ............................................ G05d 3/08
[58] Field of Search................... 318/469, 466, 12

[56] References Cited
UNITED STATES PATENTS 3,736,483   5/1973   Conlee................................ 318/469
3,431,432   3/1969   Lofstrand et al. ................ 318/466 X Primary Examiner—B. Dobeck
Attorney, Agent, or Firm—Edward J. Kelly; Herbert Berl; Harold W. Hilton

[57]  ABSTRACT

An automatic positioning mechanism for achieving extreme accuracy in dynamic repeatability based on the application of a constant torsion spring force. A member to be positioned is resiliently coupled to a drive means through a constant torsion spring. The drive means is disposed for displacing the member. The resilient coupling provides for cut-off of the drive means responsive to positioning of the member in the desired location.

4 Claims, 1 Drawing Figure

PATENTED MAY 14 1974 3,811,083
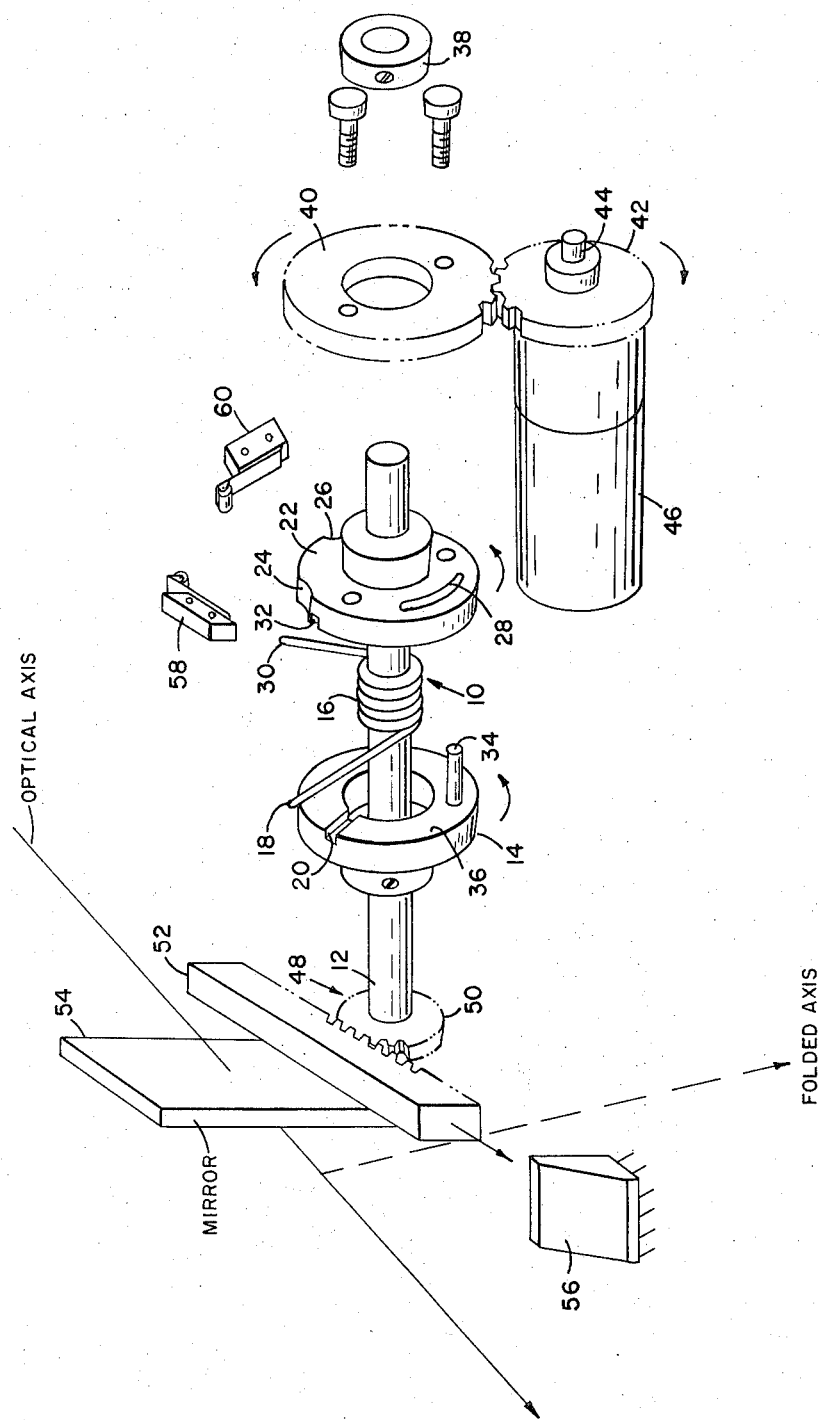

3,811,083
AUTOMATIC POSITIONING DEVICE EXHIBITING HIGH ACCURACY AND REPEATABILITY

SUMMARY OF THE INVENTION

The present invention discloses apparatus for accurately positioning a member. The apparatus exhibits high accuracy and repeatability. Apparatus includes a gear motor for driving a shaft having a pinion gear at one end thereof. The gear is disposed in meshed relation with a gear rack which supports the member to be positioned. A spring retainer plate is secured to the shaft and a cam is rotatably carried on the shaft. The cam and the retainer plate are coupled together by a torsion spring. The gear motor drives the shaft which moves the gear rack through the pre-wound torsion spring (the drive force is less than the torsion spring pre-wind force) until the rack engages a stop. The shaft and spring retainer plate is stopped from rotating while the cam continues to rotate until the cam lobe engages a micro-switch to shut off the motor. The force developed by the rack assembly is the summation of the torsion spring pre-wind and the cam overtravel. The torsion spring is retained in this wound position by the reduction gear-motor friction. The gear motor direction may be reversed to return the torsion spring to its pre-wound condition and the rack is retracted until the opposite cam lobe activates a rear micro-switch.

BRIEF DESCRIPTION OF THE DRAWING

The single FIGURE is an exploded pictorial view of the positioning apparatus of the present invention.

DESCRIPTION OF THE PREFERRED EMBODIMENT

As shown in the FIGURE, the positioning mechanism 10 includes a shaft 12 having a spring retainer plate 14 thereon. A constant torsion spring 16 is carried about shaft 12 and includes an end 18 disposed in a groove 20 provided in spring retainer plate 14. A cam 22 includes a pair of cam lobes 24 and 26 and slot 28, the cam is carried on shaft 12 is spaced relation with plate 14 prior to assembly of the device. To assemble the device the torsion spring is wound counterclockwise and end 30 of the spring is placed in a groove 32 provided on the inner surface 24 of cam 22. The cam is moved toward the spring retainer plate until a pin 34 on the inner surface 36 of retainer plate 14 protrudes through slot 28 of cam 22. The torsion spring is retained in its pre-wound condition when the cam is retained against retainer plate 14 by a collar 38. A gear 40 is secured against the cam on the outer surface thereof for meshed engagement with a gear 42 secured to a shaft 44 of a gear reduction motor 46. The torsion spring is retained in its pre-wound condition by pin 34.

Shaft 12 is provided at the distal end 48 thereof with a pinion gear 50 disposed in meshed relation with a gear rack 52 which supports the member 54 to be positioned.

In operation, after the apparatus has been assembled with spring 16 in its pre-wound position, gear motor 46 is actuated to drive the gear rack 52 through the pre-wound torsion spring. The drive force is less than the torsion spring pre-wind force. When gear rack 52 arrives against a stop 56, shaft 12 and spring retainer plate 14 stop rotating. Cam 22 continues to rotate until cam lobe 24 activates a forward micro-switch 58 to shut off motor 46.

The force developed by the rack assembly against the stop is a constant repeatable force which is the summation of the torsion spring pre-wind and the cam overtravel. The torsion spring is retained in this wound position by the reduction gear motor friction.

When the gear motor is reversed the torsion spring returns to its pre-wind condition and the rack is retracted until the opposite cam lobe 26 activates a rear micro-switch 60.

The apparatus of the present invention has many applications. In one such application as illustrated in the FIGURE, it may be used to accurately fold an infrared energy distribution onto an optical calibration standard. The position of the optical axis is then checked for accuracy against the calibrated standard.

I claim:

1. A device for accurately positioning an element comprising:
   a. mounting means for support of said element, said mounting means disposed for movement between first and second positions;
   b. stop means for limiting the movement of said mounting means;
   c. driving means for moving said mounting means between said first and second positions, said drive means including a gear motor and a shaft disposed for rotation by said gear motor; and,
   d. resiliently coupling means disposed for stopping said driving means responsive to engagement of said mounting means with said stop means, said resiliently coupling means including a spring retainer plate rigidly secured to said shaft, a cam rotatably carried on said shaft, and a torsion spring carried about said shaft intermediate said retainer plate and said cam, said torsion spring being disposed in biased relation with said retainer plate and cam.

2. A device as set forth in claim 1 wherein said spring retainer plate includes a groove to receive the first end of said torsion spring therein, and a pin extending therefrom; said cam including a groove to receive the second end of said torsion spring therein and an arcuate groove to receive said pin therein, whereby responsive to engagement of said mounting means with said stop means said shaft and said retainer plate is stopped from rotation while said torsion spring biases said cam for a predetermined rotational distance.

3. A device as set forth in claim 2 including means for stopping rotation of said cam at said predetermined distance.

4. A device as set forth in claim 3 wherein said means for stopping rotation of said cam is a micro-switch.

* * * * *